(12) United States Patent
Yamamoto et al.

(10) Patent No.: US 10,379,531 B2
(45) Date of Patent: Aug. 13, 2019

(54) TEST SYSTEM FOR PERFORMING MACHINE TEST

(71) Applicant: FANUC CORPORATION, Yamanashi (JP)

(72) Inventors: Tomoyuki Yamamoto, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 258 days.

(21) Appl. No.: 15/461,050

(22) Filed: Mar. 16, 2017

(65) Prior Publication Data

US 2017/0269582 A1 Sep. 21, 2017

(30) Foreign Application Priority Data

Mar. 17, 2016 (JP) ................................. 2016-054151

(51) Int. Cl.
*G05B 23/00* (2006.01)
*G05B 23/02* (2006.01)
*G05B 19/4065* (2006.01)

(52) U.S. Cl.
CPC ..... *G05B 23/0294* (2013.01); *G05B 19/4065* (2013.01); *G05B 23/0216* (2013.01); *G05B 23/0275* (2013.01)

(58) Field of Classification Search
CPC ................................................. G05B 23/0294
USPC ...................................................... 702/183
See application file for complete search history.

(56) References Cited

U.S. PATENT DOCUMENTS

| 4,847,795 | A | * | 7/1989 | Baker | G06F 11/2257 |
| | | | | | 702/184 |
| 5,239,487 | A | * | 8/1993 | Horejsi | G06Q 10/06 |
| | | | | | 702/184 |
| 5,754,451 | A | * | 5/1998 | Williams | G05B 19/4184 |
| | | | | | 702/185 |
| 8,418,000 | B1 | * | 4/2013 | Salame | G06F 11/079 |
| | | | | | 714/26 |
| 2011/0172633 | A1 | * | 7/2011 | Ali | A61M 5/14276 |
| | | | | | 604/500 |
| 2011/0302461 | A1 | * | 12/2011 | Goertler | G16H 40/40 |
| | | | | | 714/57 |

FOREIGN PATENT DOCUMENTS

| JP | 2000122899 A | 4/2000 |
| JP | 2005147669 A | 6/2005 |
| JP | 2005-190026 A | 7/2005 |

(Continued)

*Primary Examiner* — Hien D Khuu
(74) *Attorney, Agent, or Firm* — RatnerPrestia

(57) ABSTRACT

A test system comprises a plurality of test devices which are connected to a plurality of machines and which perform a basic test, and a test management device which is connected to the plurality of test devices via a network. The test management device includes an additional test setting part which sets an additional test for determining a cause of an abnormality when determining that the machine has the abnormality. The test management device includes an adjustment part which sets the test device that performs the additional test. The adjustment part determines that the basic test planned to be performed by the test device that performs the additional test is performed by the other test device.

3 Claims, 3 Drawing Sheets

(56) References Cited

FOREIGN PATENT DOCUMENTS

| JP | 2006-204886 | * | 4/2008 |
|----|-------------|---|--------|
| JP | 4112894 B | | 7/2008 |
| JP | 2014182470 A | | 9/2014 |

* cited by examiner

TEST SYSTEM FOR PERFORMING MACHINE TEST

BACKGROUND OF THE INVENTION

1. Field of the Invention

The present invention relates to a test system for performing a machine test.

2. Description of the Related Art

In machine manufacturing factories, there are cases in which a performance test is performed in accordance with a predetermined method when a product is finished or during the course of a manufacturing process. If a component mounted to a machine malfunctions, or assembling is poor, a test result may fail to fall within a proper range. When a result of the performance test deviates from the proper range, the operator determines a malfunctioning part using the test result. After determining a cause of the deviation of the test result from the proper range, the operator can replace the component and repair the product.

Japanese Unexamined Patent Publication No. 2005-190026A discloses a repair support system which estimates a part to be repaired of a product without depending on experiences of the repairer. It is disclosed that when the operator inputs an inspection item in which a defect occurs, this system searches a repair history database, and displays a part as repaired with respect to the inspection item in which the defect occurs.

Japanese Patent No. 4112594 discloses an abnormality diagnosis method which diagnoses an abnormality of a reduction gear of a robot. It is disclosed that a malfunction of the reduction gear is diagnosed in the abnormality diagnosis method on the basis of a torque command to a motor which drives the robot and a velocity feedback.

SUMMARY OF INVENTION

When the test result of the performance test deviates from the proper range, the operator examines a content of the test result. When a cause of the deviation of the test result from the proper range fails to be determined, there are cases in which the operator performs an additional test. However, it is necessary for the operator to have experiences and knowledge in order to determine a type of the additional test and an order of performing a plurality of additional tests. Further, since a part at which an abnormality occurs on the basis of the test result is determined, it is necessary for the operator to have experiences and knowledge. In addition, when the test result is obtained, it is necessary for the operator to judge whether or not a next additional test is to be performed. Thus, when the test result deviates from the proper range, the operator who can deal with a result of the abnormality is limited.

In particular, in manufacturing factories and the like, a plurality of products are inspected at the same time using a plurality of test devices. When the test results with respect to a plurality of products fail to fall within the proper range, it is necessary for the operator to sequentially deal with the plurality of products. Consequently, there has been a problem that it takes time until the operator determines the part at which an abnormality occurs, and productivity decreases.

The repair support system disclosed in Japanese Unexamined Patent Publication No. 2005-190026A as described above is limited to proposing parts to be repaired, and leaves a room to be improved to accurately estimate a part to be repaired.

A machine test system of the present invention is a machine test system which tests whether or not machines as manufactured normally operate. The test system comprises a plurality of test devices which are connected to the plurality of machines and perform a predetermined basic test and a test management device which is connected to the plurality of test devices via a network. The test devices are separately connected to the respective machines. The test management device includes a judgement part which judges whether or not the machines have an abnormality on the basis of a basic test result received from the test devices. The test management device includes an additional test setting part which sets an additional test for determining a cause of the abnormality when the judgement part judges that the machine has the abnormality. The test management device includes an adjustment part which sets the test device that performs the additional test. The adjustment part determines that the basic test planned to be performed by the test device that performs the additional test is performed by the other test device.

In the invention as described above, the machine test system can comprise a production planning device which manages a machine manufacturing plan. The production planning device can be connected to the test management device via a network. The test management device can include an abnormal part estimation part which estimates a part at which the abnormality occurs on the basis of the additional test result. The test management device can transmit a request for repairing the part at which the abnormality occurs as estimated by the abnormal part estimation part to the production planning device.

In the invention as described above, the machine test system can comprise a production planning device which manages a machine manufacturing plan. The adjustment part can determine that the other test device having a sufficient time in an operation plan performs the basic test so that a machine manufacture is not delayed relative to a manufacturing plan received from the production planning device.

DETAILED DESCRIPTION

Figure 1:
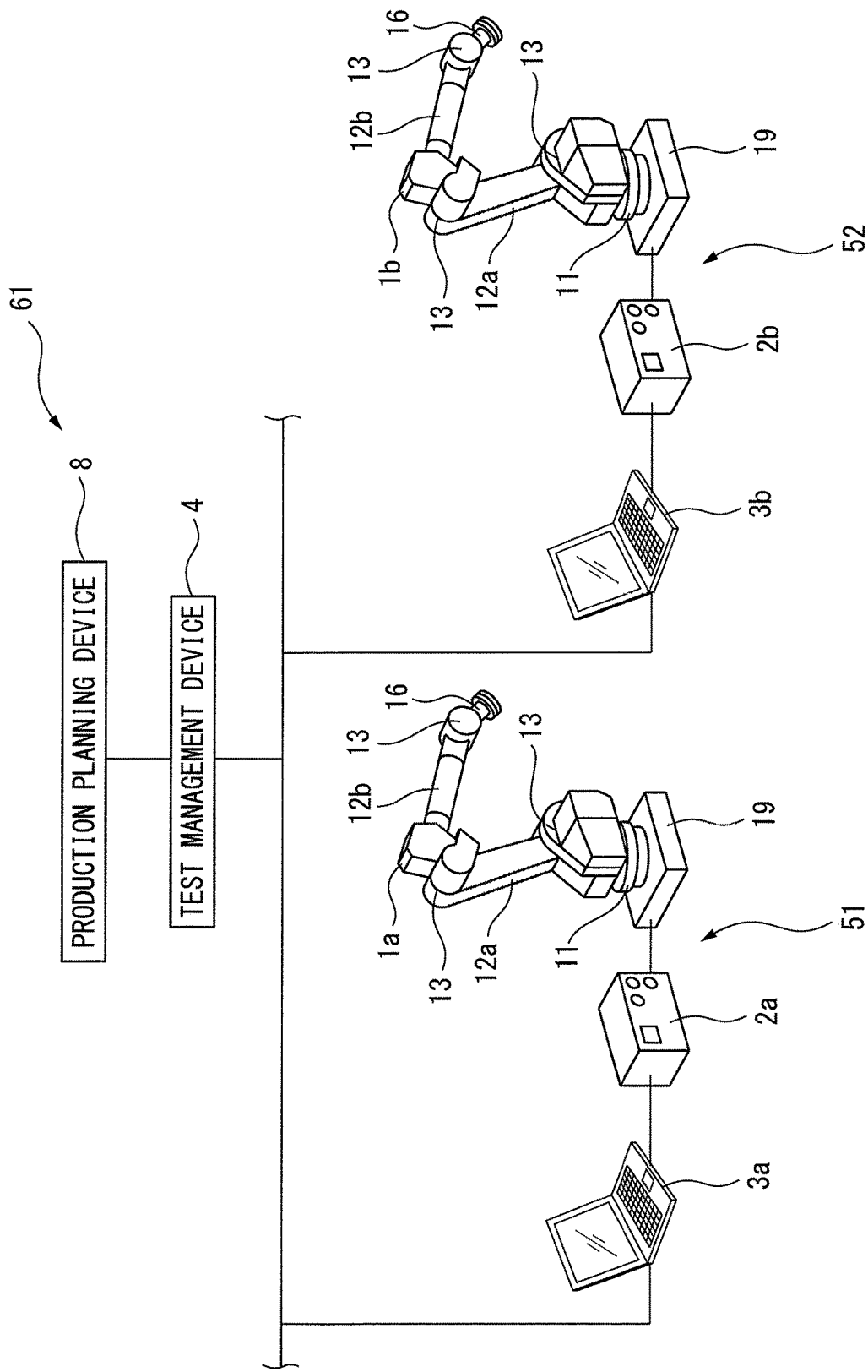
FIG. 1 is a schematic diagram of a test system according to an embodiment.
Figure 2:
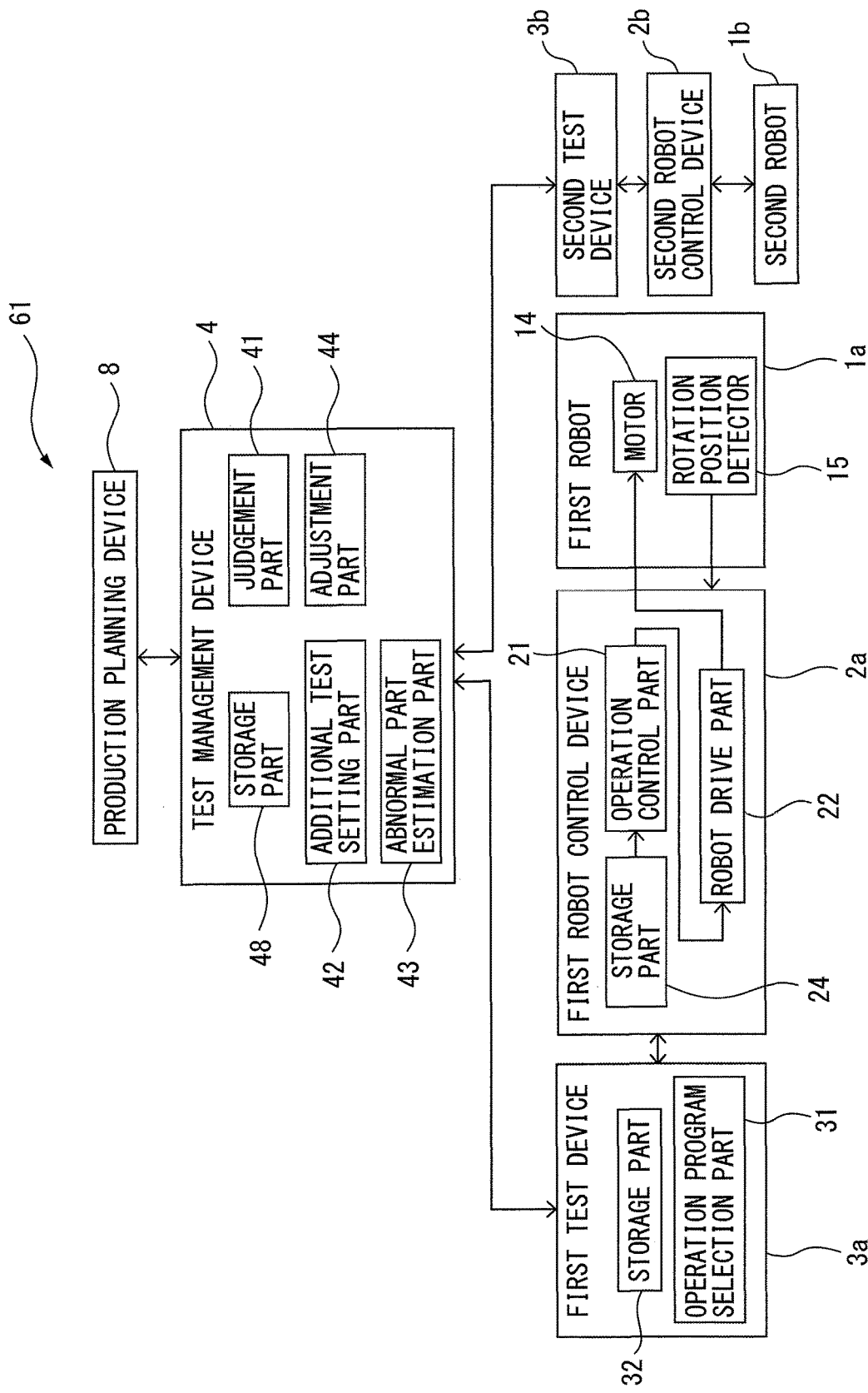
FIG. 2 is a block diagram of the test system according to the embodiment.
Figure 3:
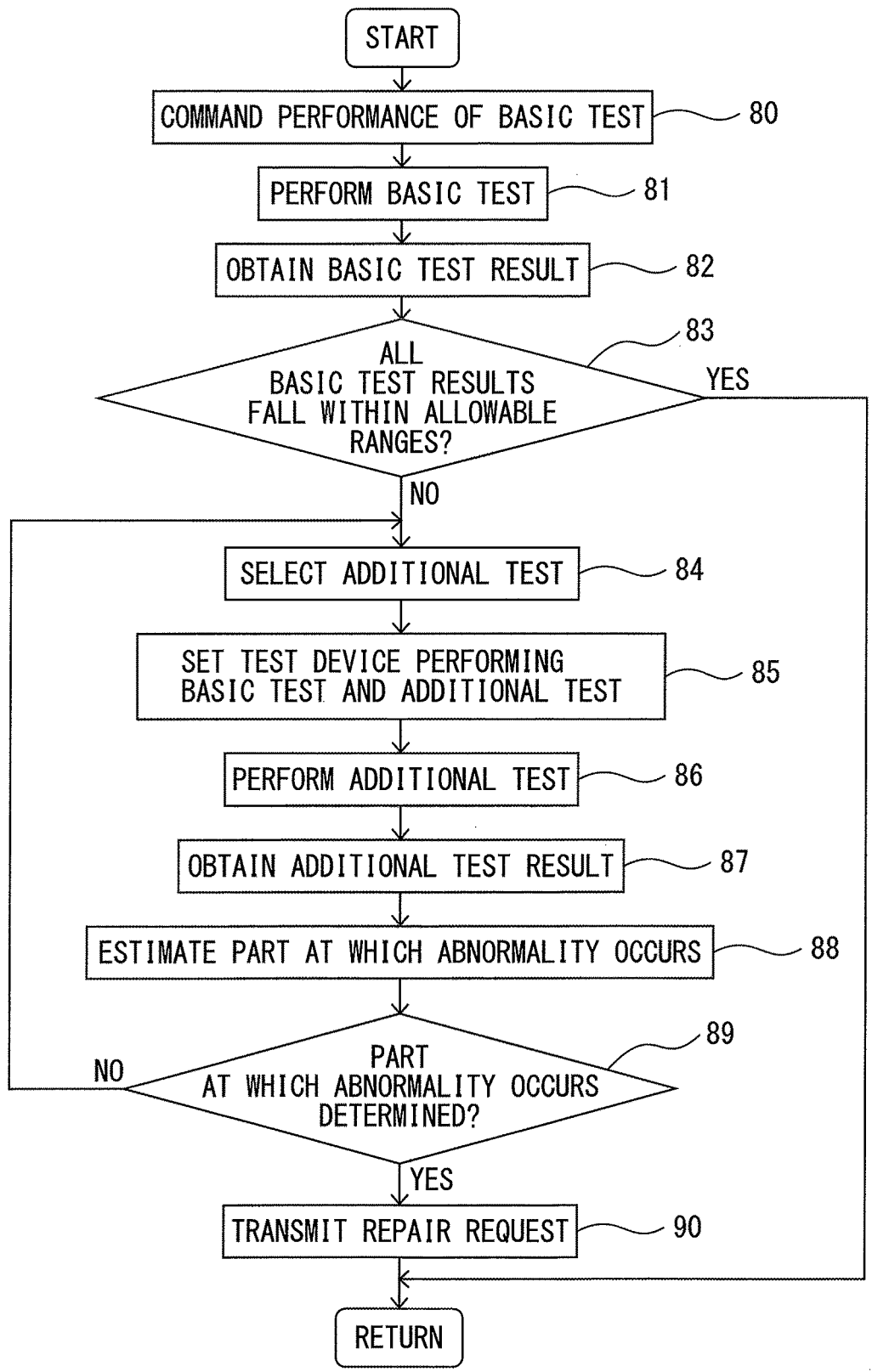
FIG. 3 is a flowchart of a control of the test system according to the embodiment.

Referring to FIG. 1 to FIG. 3, a machine test system according to an embodiment will be described. The test system according to the present embodiment is installed in a machine manufacturing factory, and performs a performance test of machines as manufactured. The machine test system tests whether or not the machine as manufactured normally operates. The machines as manufactured include a finished product and a machine as manufactured halfway.

FIG. 1 shows a schematic diagram of the test system according to the present embodiment. FIG. 2 shows a block diagram of the test system according to the present embodiment. In the present embodiment, as the machine to be inspected, a robot to which a robot control device is connected will be described by way of example.

Referring to FIG. 1 and FIG. 2, first robot device 51 includes first robot 1a and first robot control device 2a. The first robot 1a is a multi-articulated robot which includes arms 12a and 12b, a wrist portion 16, and a plurality of joint portions 13. In the robot 1a, constituent members such as a power source box and a cable are included.

The first robot 1a includes a robot drive device which drives a constituent member at each joint portion 13. The robot drive device includes a motor 14 which drives a constituent member at the joint portions 13. The motor 14 drives, thereby being capable of directing the arms 12a and 12b and the wrist portion 16 to a desired direction. The robot 1a includes a base portion 19 which is fixed on a floor surface and a rotary portion 11 which rotates with respect to the base portion 19. The robot drive device includes the motor 14 which drives the rotary portion 11.

The first robot control device 2a which controls the robot 1a is connected to the first robot 1a. The robot control device 2a includes an arithmetic processing device including a CPU (Central Processing Unit), a RAM (Random Access Memory), a ROM (Read Only Memory), and the like which are connected to each other via a bus.

The robot control device 2a includes a storage part 24 which stores information on a control of the robot 1a. The robot control device 2a can drive the robot 1a on the basis of an operation program as input in advance. The operation program is stored in the storage part 24.

The robot control device 2a includes an operation control part 21 which generates an operation command of the robot 1a on the basis of the operation program. The operation control part 21 transmits the operation command for driving the robot 1a to a robot drive part 22. The robot drive part 22 includes an electric circuit which drives the motor 14 of the robot 1a. The robot drive part 22 supplies electricity to the motor 14 on the basis of the operation command.

The robot 1a includes a state detector which detects a drive state of the robot 1a. The state detector according to the present embodiment includes a rotation position detector 15 mounted to the motor 14 of each drive axis. The rotation position detector 15 detects a rotation position when the motor 14 drives. Information on the rotation position detected by the rotation position detector 15 is transmitted to the robot control device 2a. The robot control device 2a can calculate a rotation speed on the basis of the rotation position of each drive axis. Further, the robot control device 2a can detect a position and a posture of the robot 1a on the basis of the rotation position of each motor 14.

Second robot device 52 includes second robot 1b and second robot control device 2b. The second robot 1b has a configuration similar to that of the first robot 1a. The second robot control device 2b connected to the second robot 1b has a configuration similar to that of the first robot control device 2a.

A test system 61 according to the present embodiment is configured in such a manner as to be capable of inspecting a plurality of robots at the same time. The test system 61 according to the present embodiment is configured in such a manner as to be capable of performing the same inspection for a plurality of robots.

The test system 61 according to the present embodiment performs a basic test which is a test serving as a predetermined basis. The test system 61 judges whether or not robots normally operate. Then, when the robot is judged to have an abnormality, the test system 61 performs an additional test for determining a part at which the abnormality of the robot occurs.

The test system 61 comprises a plurality of test devices 3a and 3b which are connected to the plurality of robots 1a and 1b and which perform the predetermined basic test. The test devices 3a and 3b are configured by an arithmetic processing device including a CPU, RAM, and the like. The test devices 3a and 3b are separately connected to the respective robots 1a and 1b. The test devices 3a and 3b include a storage part 32 which stores information on the test. The storage part 32 stores operation programs for performing the test. The test devices 3a and 3b include an operation program selection part 31 which selects one operation program from the plurality of operation programs stored in the storage part 32. The operation program selection part 31 selects the operation program corresponding to a test performance command received from a test management device 4. The test devices 3a and 3b transmit the operation program as selected to the robot control devices 2a and 2b. The robot control devices 2a and 2b perform the test of the robots 1a and 1b in accordance with the operation program as received.

The robot control devices 2a and 2b obtain a test result of the robots 1a and 1b. The robot control devices 2a and 2b obtain drive states of the robots 1a and 1b while driving the robots 1a and 1b in accordance with the test performance command. For example, the robot control devices 2a and 2b obtain a rotation position of the motor 14 from the rotation position detector 15 for each predetermined time interval. The test result is transmitted to the test management device 4 via the test devices 3a and 3b.

The test system 61 comprises the test management device 4 which controls the test devices 3a and 3b. The test management device 4 is connected to the test devices 3a and 3b via a network, and configured in such a manner as to be communicable with each other. The test management device 4 transmits the test performance command to the test devices 3a and 3b. Further, the test management device 4 receives the test result from the test devices 3a and 3b.

The test management device 4 is configured by an arithmetic processing device including a CPU, RAM, and the like. The test management device 4 includes a storage part 48 which stores information on test management. The test management device 4 includes a judgement part 41 which judges whether or not the robots have an abnormality on the basis of the basic test result.

The test management device 4 includes an additional test setting part 42 which sets an additional test for determining a cause of an abnormality when the judgement part 41 judges that the robots 1a and 1b have the abnormality. The test management device 4 includes an adjustment part 44 which adjusts assignment of the basic test and the additional test. The adjustment part 44 sets the test device which performs the additional test. The adjustment part 44 determines that the basic test planned to be performed by the test device which performs the additional test is performed by the other test device. The test management device 4 includes an abnormal part estimation part 43 which estimates the part at which the abnormality occurs on the basis of an additional test result.

The test system 61 comprises a production planning device 8 which is connected to the test management device 4 via a network and configured in such a manner as to be communicable with each other. The production planning device 8 manages a process of the entire factory and a product manufacturing plan. The production planning device 8 transmits the product manufacturing plan to the test management device 4. The test management device 4 determines a test type and a test plan based on the plan of manufacture.

The test devices 3a and 3b according to the present embodiment are installed in the interior of the machine manufacturing factory. The test management device 4 and the production planning device 8 may be installed in a building different from the factory. For example, the test management device 4 may be installed in a separate building inside the site of the manufacturing factory. In such a case, the test devices 3a and 3b are connected to the test management device 4 via a network such as an intranet. Further, the production planning device 8 may be installed in an office located in an area distant from the manufacturing factory. For example, the production planning device 8 is connected to the test management device 4 via a network such as an internet.

FIG. 3 shows a flowchart of a control of the machine test system according to the present embodiment. The test management device 4 sets a test plan for the robot on the basis of the robot manufacturing plan which is received from the production planning device 8.

Referring to FIG. 1 to FIG. 3, in step 80, the test management device 4 transmits a command for performing the basic test to the test devices 3a and 3b. The test management device 4 selects the basic test on the basis of the robot manufacturing plan. A type of the basic test is stored in the storage part 48. In the basic test according to the present embodiment, a test to allow the robots 1a and 1b to operate in accordance with a predetermined operation pattern is performed. In the present embodiment, at the plurality of joint portions 13, the arms 12a and 12b and the wrist portion 16 changes a direction.

In step 81, the basic test is performed. The operation program selection part 31 of the test devices 3a and 3b selects the operation program on the basis of the command for performing the basic test. The test devices 3a and 3b transmit the operation program as selected to the robot control devices 2a and 2b. The robot control devices 2a and 2b drive the robots 1a and 1b on the basis of the operation program.

The robot control devices 2a and 2b obtain a drive state in each drive axis when allowing the robots 1a and 1b to operate. The drive state may include a current supplied to the motor 14 and a rotation angle detected by the rotation position detector 15, for example.

Note that in the present embodiment, a value of the current contained in an operation command which is transmitted by the operation control part 21 to the robot drive part 22 is detected. As the value of the current supplied to the motor 14, the current actually supplied to the motor 14 may be detected by an ammeter.

In step 82, the test management device 4 receives a basic test result. The robot control devices 2a and 2b transmit the basic test result to the test management device 4 via the test devices 3a and 3b. The basic test result contains the value of the current supplied to the motor 14 which drives each joint portion 13 and the rotation angle detected by the rotation position detector 15. Further, the basic test result may contain speed and acceleration in each drive axis, which is calculated on the basis of the rotation angle in each drive axis. In addition, the basic test result may contain a position deviation with respect to an actual rotation position in response to the operation command, and the like.

In step 83, the judgement part 41 of the test management device 4 judges whether or not all the basic test results fall within allowable ranges. In other words, the judgement part 41 judges whether or not the robots 1a and 1b have an abnormality. The judgement part 41 judges whether or not the detected value of the drive state obtained during performing the basic test falls within an allowable range. The allowable range is determined in advance. The allowable range is stored in the storage part 48.

For example, the judgement part 41 judges whether or not the current supplied to the motor 14 is greater than a predetermined judgement value of the current. When the current supplied to the motor 14 is greater than the judgement value, the judgement part 41 can judge that the robot have the abnormality.

In step 83, when all the basic test results fall within the allowable ranges, the robot is judged to be normal, and this control is terminated. The test devices 3a and 3b perform the test of the next robot.

In step 83, when at least one detected value deviates from the allowable range, the judgement part 41 judges that the robot has an abnormality. Since the basic test result is improper, the judgement part 41 can judge that components mounted to the robots include a malfunctioning component. Alternatively, the judgement part 41 can judge that assembling of the robot 1a is inappropriate. In this case, the control proceeds to step 84. Herein, a case in which the first robot 1a among the plurality of robots 1a and 1b is judged to have an abnormality is illustrated.

In step 84, the additional test setting part 42 of the test management device 4 selects the additional test for determining a part at which the abnormality occurs. The storage part 48 stores a plurality of types of the additional tests.

The additional test is not limited to the same test as the basic test as described above. For example, in the additional test, a test in which the robot is allowed to operate in each single drive axis so as to judge whether or not the abnormality is found, thereby determining the drive axis having the abnormality can be performed. Alternatively, in the additional test, a test in which a speed of driving the drive axis is changed so as to judge whether or not a magnitude of the abnormality depends on the speed can be performed. Further alternatively, in the additional test, a sampling period for obtaining the drive state of the robot is shortened, whereby a change of the drive state in detail can be obtained. The test management device 4 analyzes the drive state in detail, whereby the part of the abnormality can be estimated.

In step 85, the adjustment part 44 of the test management device 4 sets the test device which performs the additional test and the test device which continuously performs the basic test. In the example herein, the adjustment part 44 determines that the first test device 3a which has tested the first robot 1a having the abnormality performs the additional test.

It is often the case that the additional test necessitates longer time than the basic test. The test device is incapable of performing the basic test while performing the additional test. Accordingly, the adjustment part 44 sets the other test device 3b which performs the basic test planned to be performed by the test device 3a which performs the additional test. In other words, the test management device 4 performs a control for transferring the basic test to be performed by the test device which has tested the robot determined to have the abnormality to the other test device.

Herein, the adjustment part 44 sets the second test device 3b to perform the basic test to be performed by the first test device 3a. The test management device 4 transmits to the first test device 3a a command for performing the additional test. The test management device 4 transmits to the second test device 3b a command for performing the basic test planned to be performed by the first test device 3a.

In step 86, the operation program selection part 31 of the first test device 3a selects the operation program on the basis of the command for performing the additional test. The test device 3a transmits the operation program to the robot control device 2a. The robot control device 2a performs the additional test. The robot control device 2a detects variables on the drive state of the robot 1a while driving the robot 1a. In other words, the robot control device 2a obtains an additional test result.

In step 87, the test management device 4 obtains the additional test result. The robot control device 2a transmits the additional test result to the test management device 4 via the test device 3a.

In step 88, the abnormal part estimation part 43 of the test management device 4 estimates the part at which the abnormality of the robot 1a occurs on the basis of the additional test result. In other words, the abnormal part estimation part 43 estimates a cause of the occurrence of the abnormality.

Next, in step 89, the abnormal part estimation part 43 judges whether or not the part at which the abnormality occurs is determined. In step 89, when the part at which the abnormality occurs fails to be determined, the control proceeds to step 84. In step 84, the additional test setting part 42 selects still another additional test. In the control from step 85 to step 86, still another additional test is performed. In the control from step 87 to step 89, the abnormal part estimation part 43 estimates the part at which the abnormality occurs. Thus, the test system 61 according to the present embodiment performs the test while changing the types of the additional tests until the part at which the abnormality occurs is determined. In other words, the test system 61 performs the additional test until the cause of the abnormality is determined.

In step 89, when the abnormal part estimation part 43 has determined the part at which the abnormality occurs, the control proceeds to step 90.

In step 90, the test management device 4 transmits information on the part at which the abnormality occurs to the production planning device 8. Further, the test management device 4 transmits a request for repairing the part at which the abnormality occurs to the production planning device 8.

In the factory, the operator moves the robot 1a in which the abnormality occurs to a predetermined place. The test device which has performed the additional test resumes the initial basic test. The operator replaces the component of the part at which the abnormality occurs. Alternatively, the operator repairs the part at which the abnormality occurs. Subsequently, the test system 61 again performs the basic test with respect to the robot 1a. When a basic test result is proper, the robot 1a is shipped out. Alternatively, when a basic test result is proper, the robot 1a is transferred to a next manufacturing process.

Thus, the test system 61 according to the present embodiment can determine a part at which an abnormality occurs by performing the additional test. Next, specific examples of the basic test and the additional test when the product is a robot will be described.

As a result of performing the basic test, in step 83, there are cases in which the value of the current supplied to the motor 14 of the first robot 1a deviates from the allowable range. In other words, there are cases in which the value of the current supplied to the motor 14 becomes greater than the predetermined judgement value. The robot control device 2a performs a feedback control based on the rotation angle detected by the rotation position detector 15. Consequently, if an actual position lags relative to an operation command position, the operation control part 21 performs a control for increasing the current supplied to the motor 14.

When the value of the current supplied to the motor 14 exceeds the allowable range, it can be judged that a mechanical resistance or an electrical resistance in the robot 1a is present. As a cause of the generation of the mechanical resistance, it can be considered that an abnormality occurs in a reduction gear mounted to the drive shaft or the motor. As a cause of the generation of the electrical resistance, it can be considered that an abnormality occurs at a cable which supplies electricity to the motor.

In step 84, the additional test setting part 42 selects one additional test from a plurality of additional tests stored in the storage part 48 in advance. The additional test setting part 42 according to the present embodiment sets the additional test on the basis of the basic test result in such a manner as to be capable of determining the cause in a short time. Such a control for setting the additional test is stored in the storage part 48 in advance.

When the value of the current supplied to the motor is large, if the value of the current exceeds the allowable range in most of operations of the robot, determining the drive axis at which the abnormality occurs is difficult. The additional test setting part 42 sets the additional test for determining the drive axis at which the value of the current exceeds the allowable value. The additional test setting part 42 sets the additional test for driving the robot 1a at each single drive axis. In the additional test, the value of the current when the robot 1a is driven at each single drive axis is detected.

On the other hand, when the basic test of the robot is performed, if a period in which the value of the current exceeds the allowable range is short, it can be judged that the abnormality occurs in the drive axis driven during the period in which the value of the current exceeds the allowable range. In this case, with respect to the drive axes which have been driven during the specific period, the additional test setting part 42 sets the additional test for driving the robot 1a at each single drive axis.

Note that when the number of the drive axes which have been driven during the period in which the value of the current exceeds the allowable range is one, the abnormal part estimation part 43 can judge that the abnormality occurs in a part related to the drive axis.

Next, in step 86, the additional test to allow the robot to operate at each single drive axis is performed. In step 88, the abnormal part estimation part 43 can estimate the drive axis at which the value of the current is increased. However, with respect to the part related to the drive axis as specified, the abnormal part estimation part 43 cannot determine which part is abnormal among the motor, the reduction gear, and the cable. In step 89, the abnormal part estimation part 43 cannot determine the part at which the abnormality occurs. Consequently, the control proceeds to step 84. Then, the second additional test is performed.

In step 84, the additional test setting part 42 selects the additional test for determining the part at which the abnormality occurs among the motor, the reduction gear, and the cable. In this example, with respect to the drive axis as estimated at which the abnormality occurs, the additional test setting part 42 sets the additional test for detecting a position deviation. In the second additional test, the robot 1a is driven with respect to the specific drive axis as estimated at which the abnormality occurs.

In the second additional test, the specific drive shaft of the robot 1a is driven in accordance with a predetermined operation pattern. Then, during a period in which the specific drive shaft of the robot 1a is driven, a position deviation is obtained. The robot control device 2a can detect a difference between a position command in the drive axis which is generated by the operation control part 21 and a rotation position detected by the rotation position detector 15 as the position deviation.

In step 85, since the test device 3a which performs the additional test has been already set, the control proceeds to step 86. In step 86, the operation program selection part 31 of the test device 3a selects the operation program stored in the storage part 32. The robot control device 2a performs the additional test on the basis of the operation program.

In step 87, the test management device 4 receives a test result. In step 88, the abnormal part estimation part 43 estimates a part at which the abnormality occurs. For example, when the abnormality of the cable such as breakage of the cable is present, a cable contact becomes strong or weak depending on the position and the posture of the robot 1a. Then, the position deviation changes in accordance with the position and the posture of the robot 1a. Thus, when the position deviation changes in accordance with the position and the posture of the robot 1a, the abnormal part estimation part 43 estimates that the cable has the abnormality.

Alternatively, there are cases in which when a rotation shaft of the motor 14 rotates, the position deviation vibrates. When a vibration cycle of the position deviation corresponds to a rotation cycle of the motor, the abnormal part estimation part 43 estimates that the motor malfunctions.

Further, when the position deviation becomes greater in accordance with an increase in the rotation speed of the rotation shaft of the motor 14, the abnormal part estimation part 43 estimates that the reduction gear malfunctions. Alternatively, there are cases in which the position deviation vibrates when the reduction gear malfunctions. When the position deviation vibrates in a cycle different from the rotation cycle of the motor, the abnormal part estimation part 43 estimates that the reduction gear malfunctions.

Thus, the robot 1a is driven in each single drive axis, whereby the abnormal part estimation part 43 can determine the drive axis at which the abnormality occurs. The abnormal part estimation part 43 can estimate the part at which the abnormality occurs on the basis of the position deviation when the single drive axis is driven.

Note that the additional test is not limited to the embodiment as described above, and any test can be employed. For example, when a mechanical resistance is generated, the friction becomes greater in accordance with an increase in the rotation speed in the drive axis. A magnitude of friction is proportional to the rotation speed of the motor. Accordingly, a test to change the rotation speed in the specific drive axis can be performed in the additional test. When the position deviation changes in accordance with the rotation speed in the drive axis, the abnormal part estimation part 43 can estimate that a mechanical resistance is present. In other words, the abnormal part estimation part 43 can estimate that the cable is normal but on the other hand, an abnormality occurs at the motor or the reduction gear.

In the embodiment as described above, the additional test setting part 42 selects the most suitable additional test from the plurality of additional tests stored in the storage part 48 in order to determine a cause on the basis of a basic test result. The additional test setting part 42 is not limited to this embodiment. For example, with respect to all the drive axes, the additional test setting part 42 may set a test to allow the robot to operate in each drive axis. Alternatively, the additional test setting part 42 may set a test for detecting the position deviation with respect to all the drive axes.

Further, the test management device 4 may perform a control for sequentially performing all the additional tests stored in the storage part 48. However, if all the additional tests are sequentially performed, the time for the additional tests becomes extremely long, which deteriorates productivity. The additional test setting part 42 can perform a control for determining the next additional test to be performed on the basis of a basic test result and an additional test result as performed so far. By adopting this control, the part at which the abnormality occurs can be determined efficiently in a short time.

The machine test system according to the present embodiment automatically performs the additional test for determining the cause of the abnormality when it is judged that the machine has the abnormality. Thus, without depending on experiences and knowledge of the operator, and the like, the part at which the abnormality occurs can be automatically estimated. Further, the test system causes the other test device to perform the basic test planned to be performed by the test device which performs the additional test. The test device which performs the additional test can no longer perform the basic test. However, the basic test of the product is performed by the test device which does not perform the additional test, thereby being capable of suppressing a delay in production.

In particular, the adjustment part 44 receives a manufacturing plan for a predetermined period from the production planning device 8. Then, the adjustment part 44 can set the test device which performs the basic test and the test device which performs the additional test so that the machine manufacture is not delayed relative to the manufacturing plan. The adjustment part 44 can perform a control for transferring the basic test to the test device having a sufficient time in an operation plan. For example, the adjustment part 44 can transfer the basic test to the test device having a small number of basic tests planned to be performed.

The test system 61 may include third test device in addition to the first test device 3a and the second test device 3b. In other words, the test system 61 may include three or more test devices. When the additional test is performed by the first test device 3a, the adjustment part 44 determines that the robot which the basic test has been planned to be performed by the first test device is tested by the second test device or the third test device. At this time, the adjustment part 44 can transfer the basic test to the test device having a sufficient time in a test plan. By performing this control, a delay in production due to performance of the additional test can be suppressed.

Further, the adjustment part 44 may distribute the basic test to the plurality of test devices so that a robot manufacture is not delayed relative to a manufacturing plan. For example, when the additional test is performed by the first test device 3a, the adjustment part 44 may distribute the basic test of the robot planned to be performed by the first test device to both the second test device and the third test device.

In the machine test system 61 according to the present embodiment, the test management device 4 transmits the request for repairing the part at which the abnormality occurs as estimated by the abnormal part estimation part 43 to the production planning device 8. By performing this control, when a cause of the abnormality is determined, the request for repairing a component can be automatically made, whereby the productivity is improved.

The operator can request the manufacturer of a component for repairing the component in accordance with a cause of the abnormality and the repair request received by the production planning device 8. Alternatively, the production planning device 8 may automatically transmit a repair request to the manufacturer of the component after receiving the repair request.

Note that depending on the part at which the abnormality occurs, the test management device 4 may request the operator for performing a repair. For example, when the abnormal part estimation part 43 determines that the component is defectively mounted, the test management device 4 may display a request to the operator for mounting the component once more on a display part of the test management device 4.

Alternatively, after the abnormal part estimation part 43 estimates the part at which the abnormality occurs, any control can be performed. For example, the test management device 4 may be configured to display the part at which the abnormality occurs on the display part and request to confirm the same to the operator.

In the embodiments as described above, the first test device and the second test device perform the same basic test, but the embodiment is not limited to this, and the plurality of test devices may perform basic tests different from each other. Also in this case, when the abnormality of the first robot is detected, the second test device may perform the basic test performed by the first test device.

In the test system according to the present embodiment, the test devices and the robot control devices are configured by separate devices, but the robot control devices and the test devices may be integrally formed. For example, the robot control devices may include the operation program selection part.

The machine according to the present embodiment is a robot, but the embodiment is not limited to this, and the present invention can be employed for the test system which tests any machine. For example, the test system of the present invention can be employed for a test of a machine such as an electronic device having no movable portion in addition to the machine having a movable portion.

Further, in the embodiments as described above, the test system is installed in the machine manufacturing factory, but the embodiment is not limited to this, and the test system of the present invention can be applied to a machine inspection. For example, in a factory in which a predetermined operation is performed by a plurality of robots, the test system of the present invention can be applied when a periodic performance test of the plurality of robots is performed.

According to the present invention, the machine test system which accurately estimates the part at which the abnormality occurs while suppressing the delay in the test can be provided.

The embodiments as described above can be suitably combined with each other. In the above respective drawings, the same reference numerals are assigned to the same or equivalent parts. Note that the above embodiments are exemplary and are not intended to limit the present invention. In addition, the embodiments include modifications to the embodiments as recited in the claims.

The invention claimed is:

1. A machine test system which tests whether or not a plurality of machines as manufactured operate normally, the plurality of machines as manufactured include a finished product and a halfway finished product, the machine test system comprising:
    a plurality of test devices which are connected to the plurality of machines and perform a predetermined basic test; and
    a test management device which is connected to the plurality of test devices via a network, wherein
    each of the test devices are separately connected to the respective machines, and
    the test management device includes:
        a judgement part which judges whether or not the respective machines has an abnormality based on a basic test result received from the respective test devices;
        an additional test setting part which sets an additional test for determining a cause of the abnormality when the judgement part judges that the respective machines has the abnormality;
        an adjustment part which sets the respective test devices that performs the additional test to no longer perform the predetermined basic test, and determines that the predetermined basic test planned to be performed by a different test device does not perform the additional test; and
        an abnormal part estimation part which estimates a component of the respective machines at which the abnormality occurs based on an additional test result,
    wherein the additional test is a test which is different from the predetermined basic test, and
    wherein the additional test setting part sets an another additional test which is different from the additional test when the abnormal part estimation part fails to determine the component of the respective machines at which the abnormality occurs, and
    the respective test devices perform the another additional test.

2. The machine test system according to claim 1, further comprising a production planning device which manages a machine manufacturing plan, wherein
    the production planning device is connected to the test management device via a network, and
    the test management device transmits a request for repairing the component at which the abnormality occurs as estimated by the abnormal part estimation part to the production planning device.

3. The machine test system according to claim 1, further comprising a production planning device which manages a machine manufacturing plan, wherein
    the adjustment part determines that the other test device having a sufficient time in an operation plan performs the predetermined basic test so that a machine manufacture is not delayed relative to a manufacturing plan received from the production planning device.

* * * * *